United States Patent [19]

Tuel, Jr.

[11] Patent Number: 5,164,711
[45] Date of Patent: Nov. 17, 1992

[54] SYSTEM AND METHOD FOR GENERATING GRAPHICAL OUTPUT

[75] Inventor: William G. Tuel, Jr., San Jose, Calif.

[73] Assignee: International Business Machines Corporation, Armonk, N.Y.

[21] Appl. No.: 477,304

[22] Filed: Feb. 8, 1990

[51] Int. Cl.[5] .................................... G09G 1/28
[52] U.S. Cl. .................................... 340/701; 340/739; 340/747
[58] Field of Search ............... 340/701, 702, 703, 739, 340/747; 364/518, 521; 358/11

[56] References Cited

U.S. PATENT DOCUMENTS

| | | | |
|---|---|---|---|
| 4,200,866 | 4/1980 | Strathman | 340/739 |
| 4,311,998 | 1/1982 | Matherat | 340/739 |
| 4,360,884 | 11/1982 | Okada et al. | 340/739 |
| 4,458,330 | 7/1984 | Imsand et al. | 364/900 |
| 4,677,575 | 6/1987 | Redin | 340/739 |
| 4,829,291 | 5/1989 | Elgood et al. | 340/703 |
| 4,847,608 | 7/1989 | Bouron | 340/739 |
| 4,908,610 | 3/1990 | Yamamura et al. | 340/703 |
| 5,028,848 | 7/1991 | Bankston et al. | 340/739 |

FOREIGN PATENT DOCUMENTS

0348651A2 5/1989 European Pat. Off. .

OTHER PUBLICATIONS

Choon-Sung Kim et al., Subband Coding of Color Images Using Finite State Vector Quantization, International Conference on Acoustics, Speech and Signal Processing, 1988 vol. II, Apr. 11, 1988, pp. 753-756.

Jeffrey H. Rowe, Metafiles in Computer Graphics, Computers and Graphics, vol. 10, No. 2, 1986, pp. 103-106.

*Primary Examiner*—Ulysses Weldon
*Assistant Examiner*—M. Fatahiyar
*Attorney, Agent, or Firm*—Paul W. O'Malley, Jr.

[57] ABSTRACT

A system and method for translating vector description displays into raster images writes the vector description image, having some number of displayable colors, into more than one intermediate image file. Each intermediate image file can define only a number of colors which is smaller than the number of colors in the original display. Separate color translation tables are used to generate each intermediate file. Proper selection of the color translation tables causes each intermediate file to contain a portion of the full color information. The intermediate files are translated to intermediate raster files which are then combined into a single raster image which retains all of the colors of the original vector description image.

9 Claims, 3 Drawing Sheets

SYSTEM AND METHOD FOR GENERATING GRAPHICAL OUTPUT

BACKGROUND OF THE INVENTION

1. Field of the Invention

The present invention relates generally to generation of graphical images, and more specifically to conversion of a vector description driven display into a raster image output.

2. Description of the Prior Art

Graphical displays are becoming increasingly common for use with computer systems. Higher quality color displays can show many colors at the same time, with 8 or more bits per pixel color resolution not being uncommon.

Some display systems, such as graPHIGS, a product available from International Business Machines, generate images on a CRT display using information supplied in data structures defining the various elements displayed on the screen. Displays of this type are sometimes known as vector description displays. Other graphical displays use a raster image, which is a rectangular array of pixels with each pixel being separately addressable. Such displays use some predetermined number of bits for each pixel in the array to determine the display color for that pixel.

It is sometimes desirable to transfer images available as a vector description to a raster format for display on another device or for printing. Such a capability is provided with the graPHIGS product which can generate a graphical data display manager (GDDM) file from a selected screen image. The GDDM file can then be converted to bitmaps suitable for a raster display. One problem with such conversion is that the graPHIGS package can display up to 256 different colors on a screen (8 bit color resolution), while the GDDM compatible files will only support 16 colors (4 bit color resolution). Thus, much color information is lost when translating a graPHIGS display which utilizes the full palette of available colors.

It would be desirable to provide a system and method for generating a raster image which retains all of the colors of an original vector description image. It would be further desirable for such a technique to be relatively easy to implement and use.

SUMMARY OF THE INVENTION

It is therefore an object of the present invention to provide a system and method for translating vector description images to raster images.

It is a further object of the present invention to provide such a system and method which retains all of the colors of the original vector description display even though intermediate images support only a lesser color resolution.

It is another object of the present invention to provide such a system and method which is relatively easy to implement and to use.

Therefore, in accordance with the present invention, a system and method for translating vector description displays into raster images writes the vector description image, having some number of displayable colors, into more than one intermediate image file. Each intermediate image file can define only a number of colors which is smaller than the number of colors in the original display. Separate color translation tables are used to generate each intermediate file. Proper selection of the color translation tables causes each intermediate file to contain a portion of the full color information. The intermediate files are translated to intermediate raster files which are then combined into a single raster image which retains all of the colors of the original vector description image.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

The system and method described below provide a technique for converting from one type of display output to another. The technique described below is suitable for use in translating a graPHIGS display to a standard raster display suitable for use with a CRT display device or other display device. It will be appreciated by those skilled in the art that the system and method described below, with suitable adaptation, may be used with other systems in which it is necessary to overcome a similar translation problem.

Figure 1:
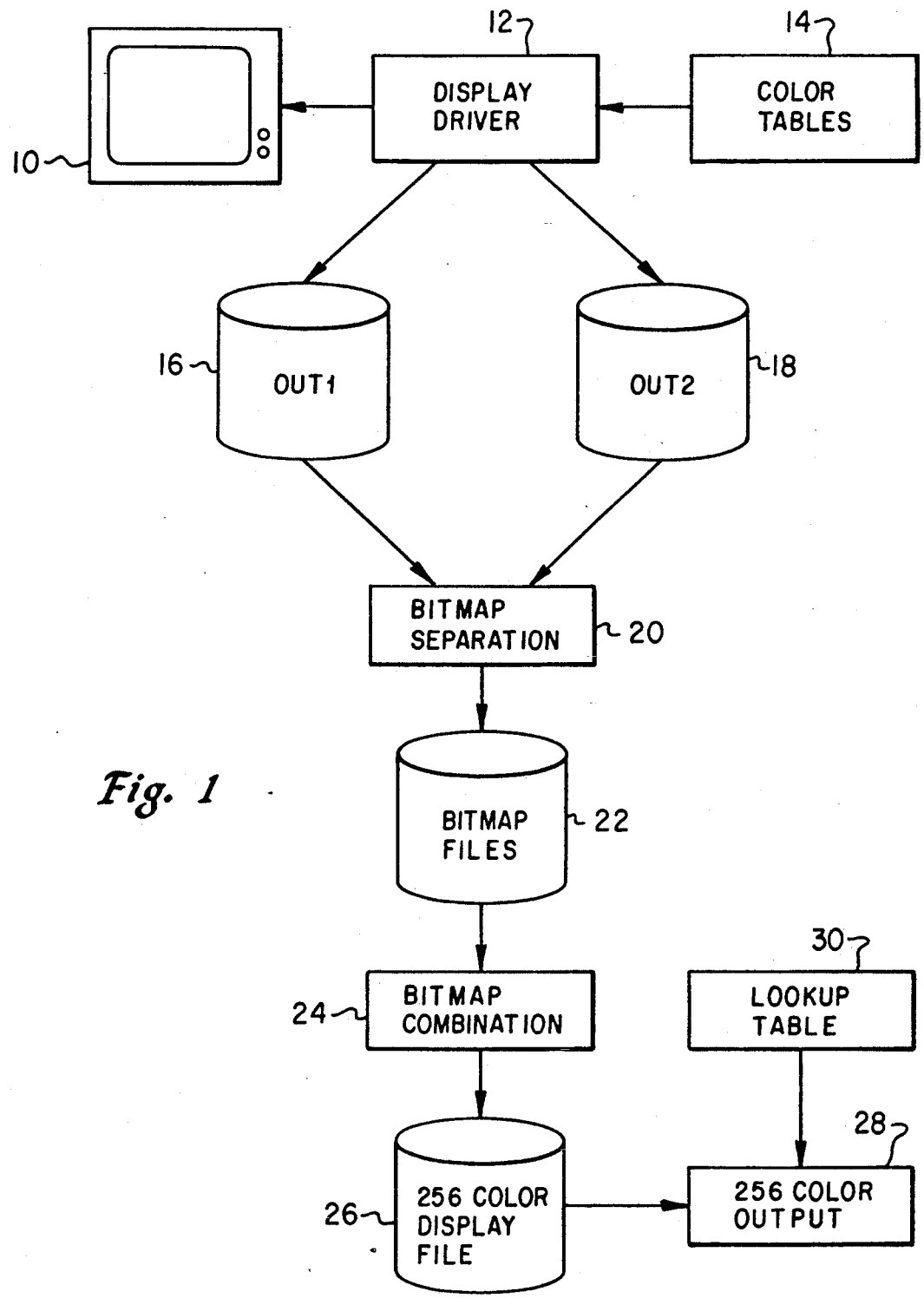
FIG. 1 is a block diagram of a system for generating a full color raster image from a vector description image.

Referring to FIG. 1, a display device 10 is driven by a display driver 12. In a preferred embodiment, display driver 12 is a GDDM/graPHIGS display driver. As is known in the art, this type of display driver 12 uses a vector representation of information to be drawn on display 10. For purposes of the present description, it will assumed that display driver 12 is able to display up to 256 different colors on display 10 simultaneously.

As is known in the art, 256 different colors can be displayed using an 8-bit color representation. In order to provide a wider selection of possible colors for display, it is common to use the 8-bit color representation value as an index into a lookup table which provides a translation of the 8-bit value into separate values used for driving red, green, and blue drivers of a color display. If an 8-bit representation is used for each color, over 16 million different colors can be displayed, although only 256 can be displayed at one time.

A graPHIGS display driver 12 uses color tables 14 to select the colors to be displayed in a known manner. As is also known, such a display driver 12 can drive more than one display device, or workstation, at a time. Workstations may be actual display devices, or they can be files used for capturing display data. In the preferred embodiment, two separate intermediate files 16, 18 are opened as workstations to the display driver 12, and are used to capture images.

When an image currently being shown on display 10 is captured and written to an intermediate file 16 or 18, ADMGDF graphic metafiles are produced. These are images having a vector description format. Each of these files 16, 18 is capable of supporting only 16 colors. This means that color information from the original image is lost. Each color of the original image is translated to one of the 16 colors used in the intermediate files 16, 18 through a color table 14. As will be described below, proper selection of the color tables 14 used for each of the files 16, 18 will allow retention of all 256 original colors when the information in files 16, 18 is later combined.

As images are being generated for display on the display 10, any desired images can be captured by writing them to the intermediate files 16, 18. Each captured image is numbered separately, or otherwise independently identified, with corresponding images in each file 16, 18 preferably having the same identifying number so that they may be easily matched at a later stage.

When all desired images have been captured, the intermediate files 16, 18 are converted by a bitmap separation program 20 into bitmap files 22. Commercially available utilities such as the GDDM utility AD-MUCDSO can be used to perform this conversion. Four or more separate bitmaps are generated for each image in each intermediate file 16, 18. Each bitmap has one bit corresponding to each pixel of the resulting raster display. The four generated bitmaps correspond to the 16 colors provided in the intermediate files 16, 18. Thus, a total of eight separate bitmaps are generated for each captured image.

A bitmap combination program 24 is then used to combine the eight separate bitmaps corresponding to a single image into a single display file 26 capable of defining up to 256 different colors. This is accomplished by, for each pixel in the raster image, combining the corresponding bit from each of the eight bitmaps for that image into a single byte. Thus, eight separate bitmap files 22, each having one bit corresponding to each pixel of the resulting display, are combined into a single 256 color display file 26 which has one byte corresponding to each pixel of the resulting display.

The 256 color display file 26 is then used to display a 256 color raster output 28 through the use of a lookup table 30. Lookup table 30 is a typical lookup table as known in the art, with each 1-byte value in the display file 26 used as an index thereinto. If the color definitions of lookup table 30 are selected to match those in the color table 14 used to drive the display 10, the color output 28 will be a raster image of the original vector display image having the same colors. If a device used to display the 256 color output 28 is not capable of producing all of the colors which can be produced by the display 10, lookup table 30 is preferably defined to produce the closest possible match.

Figure 2:
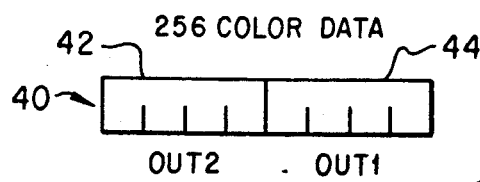
FIG. 2 illustrates how data is used in a full color image.

FIG. 2 illustrates how the 8-bit color information is divided among the two output files 16, 18. Each 8-bit entry 40 used to drive display 10 is preferably conceptually divided into an upper 4 bits 42 and a lower 4 bits 44. The upper bits 42 contain the most significant bits of the value. The output file OUT1 16 corresponds to the lower 4 bits 44, and output file OUT2 18 corresponds to the upper 4 bits 42. When the 256 color display file 26 is assembled, the bitmaps are assembled so as to reproduce the 8-bit entry 40 for the appropriate pixels.

Figure 3A:
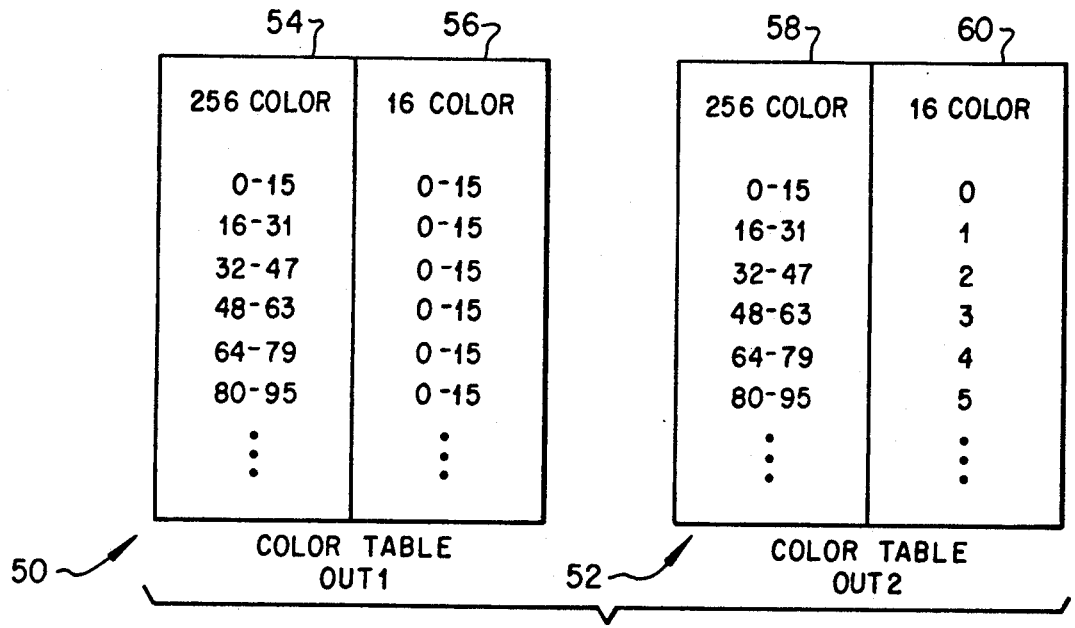
FIG. 3 shows lookup tables used in a preferred embodiment.

The color tables 14 used to produce the intermediate files 16, 18 are shown in FIG. 3(a). Color table 50 is used to generate intermediate file OUT1, and color table 52 is used to generate intermediate file OUT2. The left-hand column 54 of table 50 shows the various entries which can be used for driving the display 10, and the right-hand column 56 indicates the corresponding color defined in intermediate file 16. It will be recognized that the value in the right-hand column 56 corresponds to the least significant 4 bits of the entry in the left-hand column 54.

Left-hand column 58 of table 52 also shows the possible color values used to drive display 10, and right-hand column 60 is the corresponding value written to intermediate file 18. The value in right-hand column 60 corresponds to the most significant 4 bits of each entry in the left-hand column 58.

Figure 3B:
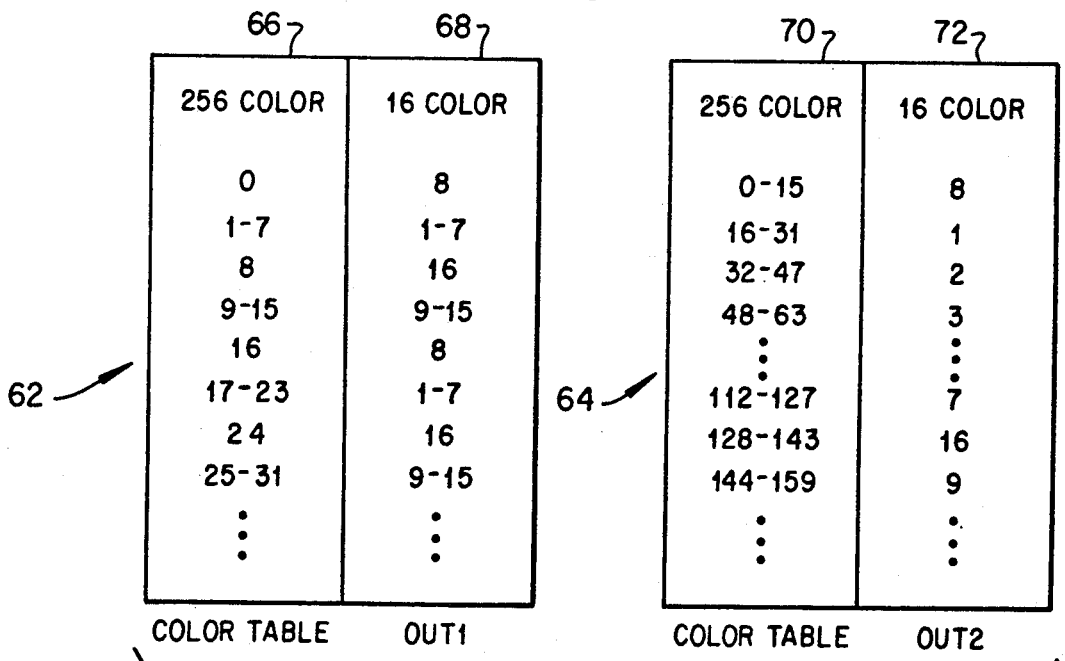

The tables 50, 52 shown in FIG. 3(a) represent the ideal case for color translation. In GDDM drivers, color 8 is a special color which is always used for the background. When this type of driver is used, it is necessary to translate color 0, used as the background for driving display 10, to color 8 for the GDDM intermediate files 16, 18. Modified tables 62, 64 for the intermediate files 16, 18, respectively are shown in FIG. 3(b). These color tables are preferred for use with a GDDM driver, while the color tables of FIG. 3(a) can be used for the general case.

Figure 4:
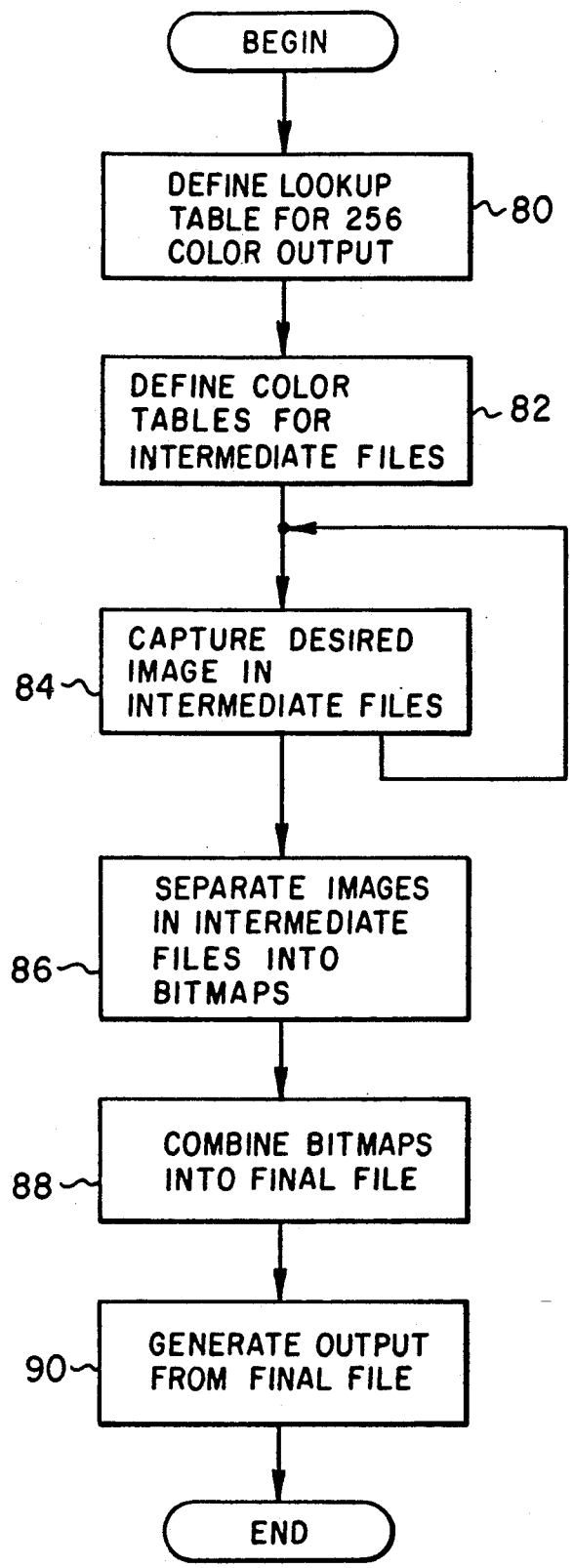
FIG. 4 is a flowchart of a preferred method for generating a raster image from a vector description image.

FIG. 4 illustrates the steps used to translate the image displayed on device 10 to a form suitable for use on a 256 color raster graphics device. The first step is to define the lookup table for the 256 color output 80. This lookup table is the lookup table 30 described in connection with FIG. 1. The next step is to define color tables 14 for the intermediate files 82. These are the color tables 50 and 52 described in connection with FIG. 3(a), or tables 62 and 64 when a GDDM driver is used FIG. 3(a).

When a desired image is produced, it is captured into the two intermediate files 84 as described above. The capturing step 84 can be repeated as often as desired, generating corresponding intermediate files 16, 18 for each captured image. The next step is to separate the images in the files 16, 18 into bitmaps 86. As described above, four separate bitmaps are produced for each file 16, 18, so that eight separate bitmaps are produced for each captured image. The bitmaps are then combined into the final file 88 as described in connection with FIG. 1, and a raster output display is generated from the final file 90. The final output file can be displayed on a color CRT, or on another output display device such as a printer or raster plotter. The output device utilizes lookup table 30, prepared in step 80, to produce the final display.

The system and method described above are suitable for producing a 256 color output from a 256 color vector display image when only 16 colors are available for use in intermediate files. This is accomplished by generating two output files for each image, with a portion of the color information contained within each file. Proper combination of the files at a later stage preserves the full 256 color image.

It will be appreciated by those skilled in the art that the details of the system and method described above are illustrative only, and can be extended in many ways depending upon the application under consideration. For example, the use of a 256 color original image is described as being split into two 16 color intermediate images. However, the described technique can be adapted to situations having different numbers of colors available for display at each stage. For example, if display 10 was capable of displaying 4096 different colors simultaneously, a 12 bit color identifier could be used by the display driver 12. In this case, it would be possible to use a third intermediate file in conjunction with files 16 and 18. In another example, the output display 28 may not be capable of displaying as many colors as is the display 10, but can display more colors than the limited number available for the intermediate files 16, 18. In the example described in connection with FIG. 1, output 28 might be capable of displaying only 32 or 64 different colors simultaneously. However, the same translation technique would be used, with the lookup table 30 providing the correct final translation to translate each of the 256 original colors into a closest corresponding color available on the display 28.

While the invention has been particularly shown and described with reference to a preferred embodiment, it will be understood by those skilled in the art that various changes in form and detail may be made therein without departing from the spirit and scope of the invention.

What is claimed is:

1. In a computer system for translating a vector description display image supporting description of colors into a raster description display image, the computer system including means responsive to data representing the vector description display image for generating intermediate files which support description of fewer colors than the vector description display image, a method of preserving original color information from the vector description display image upon translation into the raster description display image, the method comprising the steps performed by the computer system of:
   providing first and second intermediate file color tables;
   converting the vector description display image into a first intermediate file and a second intermediate file, the converting step including generating for the first and second intermediate files respectively, first and second color descriptions from the first and second intermediate file color tables;
   converting the intermediate files into intermediate raster images; and
   combining the intermediate raster images to form the raster description display image, the combining step including combining the first and second color descriptions to produce the original color information.

2. The method of claim 1, wherein the vector description display image supports description of up to 256 colors, and wherein the first and second intermediate images each supports description of up to 16 colors.

3. The method of claim 2, wherein the raster description display image supports description of up to 256 colors.

4. The method of claim 1, wherein the raster description display image uses a display format in which a color for each pixel thereof is represented by a number having n color bits and wherein each intermediate raster image has a color description in a number m color bits, where m is fewer than n.

5. The method of claim 4, wherein $n=8$, wherein there are 2 intermediate raster files, and $m=4$.

6. A system for generating a raster image graphical output supporting a color palette from a vector description graphical image supporting the color palette, comprising:
   driver means for generating displays from vector descriptions;
   first and second intermediate file color tables;
   means for generating first and second intermediate files from the vector description, said first and second intermediate files each containing a color description based upon the first and second intermediate file color tables, respectively, wherein the first and second intermediate files each support specification of a smaller number of colors than in the color palette of the vector description graphical image;
   means for converting said intermediate files into intermediate raster images; and
   means for combining the intermediate raster images into a raster image graphical output corresponding to the vector description graphical image and for generating the color palette from the color descriptions of the first and second intermediate files.

7. The system of claim 6, wherein said intermediate files are vector description files.

8. The system of claim 6, wherein said converting means converts each intermediate file into a plurality of bitmaps, each having one bit corresponding to each pixel of a raster image, and wherein said combining means combines the bits of the bitmaps which correspond to the same pixel into a single value in a raster image graphical output file.

9. The system of claim 6, wherein the vector described graphical image and the raster image graphical output can each display up to 256 colors, and wherein each of said intermediate files can display no more than 16 colors.

* * * * *